(12) United States Patent
Reno et al.

(10) Patent No.: US 10,793,723 B2
(45) Date of Patent: Oct. 6, 2020

(54) APPLICATION PACKAGE FOR POWDER COATINGS

(71) Applicant: The Sherwin-Williams Company, Cleveland, OH (US)

(72) Inventors: Thomas Reno, Americus, GA (US); Robert Breitzman, Liberty, MO (US)

(73) Assignee: The Sherwin Williams Company, Cleveland, OH (US)

( * ) Notice: Subject to any disclaimer, the term of this patent is extended or adjusted under 35 U.S.C. 154(b) by 0 days.

(21) Appl. No.: 16/288,887

(22) Filed: Feb. 28, 2019

(65) Prior Publication Data

US 2019/0264036 A1    Aug. 29, 2019

Related U.S. Application Data

(63) Continuation of application No. 14/491,204, filed on Sep. 19, 2014, now Pat. No. 10,280,314, which is a continuation of application No. PCT/US2013/030506, filed on Mar. 12, 2013.

(60) Provisional application No. 61/712,110, filed on Oct. 10, 2012, provisional application No. 61/642,578, filed on May 4, 2012, provisional application No. 61/613,647, filed on Mar. 21, 2012.

(51) Int. Cl.
| | |
|---|---|
| *C09D 5/00* | (2006.01) |
| *C09D 5/03* | (2006.01) |
| *B05D 1/06* | (2006.01) |
| *B05D 7/00* | (2006.01) |
| *C09D 7/40* | (2018.01) |
| *B29B 7/88* | (2006.01) |
| *C08K 3/22* | (2006.01) |
| *C08K 3/36* | (2006.01) |
| *C08K 5/19* | (2006.01) |

(52) U.S. Cl.
CPC .............. *C09D 5/033* (2013.01); *B05D 1/06* (2013.01); *B05D 7/52* (2013.01); *C09D 7/69* (2018.01); *B05D 2202/00* (2013.01); *B05D 2202/10* (2013.01); *B05D 2451/00* (2013.01); *B29B 7/88* (2013.01); *C08K 3/22* (2013.01); *C08K 3/36* (2013.01); *C08K 5/19* (2013.01)

(58) Field of Classification Search
None
See application file for complete search history.

(56) References Cited

U.S. PATENT DOCUMENTS

| | | | |
|---|---|---|---|
| 3,117,113 A | 1/1964 | Tudor | |
| 3,919,345 A | 11/1975 | Labana et al. | |
| 4,345,004 A | 8/1982 | Miyata et al. | |
| 4,582,863 A | 4/1986 | Wessling | |
| 5,021,473 A | 6/1991 | Macholdt et al. | |
| 5,212,245 A | 5/1993 | Franks et al. | |
| 5,380,804 A | 1/1995 | Lees et al. | |
| 5,585,426 A * | 12/1996 | Williams | ............... B05B 5/087 427/475 |
| 5,651,872 A | 7/1997 | Takeuchi et al. | |
| 5,747,150 A | 5/1998 | Yamamoto et al. | |
| 5,830,529 A | 11/1998 | Ross | |
| 5,872,163 A | 2/1999 | Hollstein et al. | |
| 6,051,641 A | 4/2000 | Howard | |
| 6,075,099 A | 6/2000 | Stark et al. | |
| 6,093,774 A * | 7/2000 | Dumain | ................. C09D 5/032 525/166 |
| 6,184,279 B1 | 2/2001 | Anderson et al. | |
| 6,238,750 B1 | 5/2001 | Correll et al. | |
| 6,276,400 B1 | 8/2001 | Jackson et al. | |
| 6,414,103 B1 | 7/2002 | Correll et al. | |
| 6,548,109 B1 | 4/2003 | Hagquist et al. | |
| 6,602,582 B2 | 8/2003 | Winterowd | |
| 6,641,710 B2 | 11/2003 | Sakura et al. | |
| 6,743,379 B2 | 6/2004 | Gottschling et al. | |
| 6,875,479 B2 | 4/2005 | Jung et al. | |
| 6,946,202 B1 | 9/2005 | Maruta et al. | |
| 7,041,340 B2 | 5/2006 | Kittle et al. | |
| 7,285,303 B2 | 10/2007 | Martin et al. | |
| 7,507,440 B2 | 3/2009 | Reising et al. | |
| 7,550,176 B2 | 6/2009 | Ohkoshi et al. | |
| 7,595,372 B2 | 9/2009 | Lejeune et al. | |
| 2001/0020060 A1 | 9/2001 | Lucarelli et al. | |
| 2003/0026993 A1 | 2/2003 | Agawa et al. | |

(Continued)

FOREIGN PATENT DOCUMENTS

| | | |
|---|---|---|
| CN | 101128267 | 2/2008 |
| EP | 2153911 | 2/2010 |

(Continued)

OTHER PUBLICATIONS

Kenny et al., "Analytical Approach for High Quality Appearance Powder Coatings," Journal of Coatings Technology, vol. 68, No. 855, Apr. 1996 (9 pages).

Johansson et al., "On the Synthesis and Characterization of New Low Temperature Curing Powder Coatings Cured with Radiation," Journal of Coatings Technology, vol. 70, No. 884, Sep. 1998 (6 pages).

Uhlmann et al., "Influence of Additives on Interfacial Phenomena During Film Formation of Powder Coatings," Journal of Coatings Technology, vol. 73, No. 915, Apr. 2001 (7 pages).

International Search Report for related International Application No. PCT/US2012/070347, dated Apr. 12, 2013 (4 pages).

(Continued)

*Primary Examiner* — Stefanie J Cohen
(74) *Attorney, Agent, or Firm* — Merchant & Gould P.C.

(57) ABSTRACT

Methods and systems for coating metal substrates are provided. The methods and systems include a powder coating composition comprising a polymeric binder and an application package. The application package includes at least one antistatic component and at least one post-blended component. Use of the application package reduces back ionization and faraday cage effects during electrostatic application. The described methods provide coatings with optimal surface smoothness and edge coverage.

7 Claims, No Drawings

(56) References Cited

U.S. PATENT DOCUMENTS

| | | | |
|---|---|---|---|
| 2003/0124248 A1* | 7/2003 | Tullos | C09D 135/06 427/195 |
| 2003/0194554 A1 | 10/2003 | Petersen et al. | |
| 2004/0185259 A1 | 9/2004 | Nicholl et al. | |
| 2005/0119437 A1 | 6/2005 | Wenning et al. | |
| 2005/0132930 A1 | 6/2005 | Schlegel | |
| 2006/0156948 A1 | 7/2006 | Hendriks et al. | |
| 2006/0264548 A1 | 11/2006 | Liu et al. | |
| 2008/0171145 A1 | 7/2008 | Stants et al. | |
| 2008/0289968 A1 | 11/2008 | Menovcik et al. | |
| 2009/0130304 A1 | 5/2009 | Muth et al. | |
| 2009/0192247 A1 | 7/2009 | Daly et al. | |
| 2010/0028582 A1 | 2/2010 | Joch et al. | |
| 2010/0095837 A1 | 4/2010 | Suman | |
| 2010/0227141 A1 | 9/2010 | Morales | |
| 2010/0266782 A1 | 10/2010 | Langlois | |
| 2010/0297422 A1 | 11/2010 | Lucas | |
| 2011/0300294 A1 | 12/2011 | Nachtman et al. | |
| 2013/0040066 A1* | 2/2013 | Thompson | B05B 5/0535 427/470 |
| 2014/0011040 A1 | 1/2014 | Decker et al. | |
| 2015/0044476 A1 | 2/2015 | Decker et al. | |

FOREIGN PATENT DOCUMENTS

| | | | |
|---|---|---|---|
| JP | H08-253711 A | 10/1996 | |
| JP | H1072557 | 3/1998 | |
| JP | 3380135 B2 | 2/2003 | |
| JP | 2003-211083 A | 7/2003 | |
| WO | WO-2011134986 A1 * | 11/2011 | B05D 7/542 |

OTHER PUBLICATIONS

International Search Report for related International Application No. PCT/US2013/030506, dated Jul. 10, 2013 (7 pages).

Third-Party Submission under CFR 1.290 for U.S. Appl. No. 14/522,143, filed May 27, 2015 (19 pages).

Coating Additives, 2nd Edition, edited by Lin Xuanyi, Chemical Industry Press, pp. 859-860.

The Handbook of Domestic and Foreign Coating Additives, 2nd edition, edited by Guo Shujing, etc., Chemical Industry Press, pp. 312-313.

Examination Report for European patent appl. No. 13763501.7, dated Feb. 7, 2018 (5 pages).

* cited by examiner

APPLICATION PACKAGE FOR POWDER COATINGS

CROSS-REFERENCE TO RELATED APPLICATION(S)

This application is a continuation of U.S. patent application Ser. No. 14/491,204, now U.S. Pat. No. 10,280,314, filed Sep. 19, 2014, which claims the benefit of International Application No. PCT/US2013/030506 filed on March 12. 2013, which claims benefit of U.S. Provisional Application No. 61/712,110 filed on Oct. 10, 2012, U.S. Provisional Application No. 61/613,647 filed on Mar. 21, 2012 and U.S. Provisional Application No. 61/642,578 filed on May 4, 2012, each of which is incorporated herein by reference in its entirety.

BACKGROUND

Powder coatings are solvent-free, 100% solids coating systems that have been used as low VOC and low cost alternatives to traditional liquid coatings and paints.

Powder coating of metal parts is a common practice. It is difficult, however, to coat certain parts of a metal substrate, including edges and corners, for example, to obtain a uniform coating using typical powder coating processes, and edge corrosion is a common problem. Typically, when powder coatings are applied to metal parts, powder particles do not flow into corners, over edges, or into other recessed areas due to faraday cage effects. Moreover, when a powder coating composition is applied to a surface already coated with an uncured or non-gelled powder, surface charge tends to build up on the surface, leading to significant back ionization. This may result in undesirable electrostatic mixing of layers in the coating, and a consequent reduction in smoothness and gloss. Conventional systems that attempt to overcome faraday cage effects and back ionization problems typically require line modifications, modifications to the spray apparatus or changes to the physical characteristics of the powder composition itself. However, such methods typically lead to process inefficiency, increased costs and delay.

From the foregoing, it will be appreciated that there is a need for effective powder coating of metal parts, where faraday cage effects and back ionization are eliminated, and where the coating demonstrates excellent performance characteristics, such as excellent corrosion protection, including at the edges, and optimal surface smoothness or gloss, without significant equipment or line modification.

SUMMARY

The invention described herein includes methods and systems for coating metal substrates using one or more powder compositions. In an embodiment, the methods include providing a metal substrate and applying a first powder coating on the substrate. A second powder coating is then applied on the first powder coating, where the second powder coating includes at least one polymeric binder resin and an additive package. The two coatings are then cured simultaneously to produce a coating with good corrosion resistance, including at the corners, edges and other recessed areas, and optimal surface smoothness or gloss.

In another embodiment, the present invention includes systems for coating a metal substrate. The system includes at least one powder composition with an application additive. When the powder composition is electrostatically applied over a non-gelled powder coating on a substrate, the resultant coating has optimal corrosion resistance and surface smoothness or gloss.

In another embodiment, the present invention includes methods for coating a metal substrate, where the methods include providing at least one polymeric binder resin, adding an application package to form a mixture, and extruding the mixture. The methods further include pulverizing the mixture to form a powder coating composition.

In yet another embodiment, the present invention includes methods and systems for coating a metal substrate, where the methods and systems include providing at least a first powder composition, which includes an application package. The application package includes an antistatic component and a highly dispersed component.

The details of one or more embodiments and aspects of the invention are set forth below. Other features, objects, and advantages of the invention will be apparent from the description and from the claims.

Selected Definitions

Unless otherwise specified, the following terms as used herein have the meanings provided below.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate. Additionally, the term "metal substrate," as used herein refers to substrates that are untreated, unprimed or clean-blasted, and also to surfaces that have been primed or pretreated by various methods known to those of skill in the art.

The term "smoothness", as used herein, refers to the specular gloss or light reflectance from a powder-coated surface. It is typically obtained by comparing the specular reflectance from a coated sample to the specular reflectance from a black glass standard. As used herein, smoothness may be expressed by any means known to those of skill in the powder coating art, including visual standards developed by the Powder Coating Institute. Under this standard, a visual scale of ten powder-coated panels, graded from 1 (high roughness/orange peel) to 10 (very smooth, high gloss finish) is used. To determine relative smoothness, a powder-coated sample is visually compared with the standard panels, and a smoothness grade is assigned by judging which standard panel is closest to the sample. In the alternative, surface smoothness may be expressed as 20-degree or 60-degree gloss measured using ASTM Method D523. Additionally, smoothness may be assessed by other methods known in the art, including for example, monitoring the distinctness of the image (DOI), where the reflection of a powder-coated sample in each of the 10 PCI test panels is photographed, and the speed of a beam of light reflected from the surface is measured by a special instrument. Surfaces that reflect an image perfectly have DOI value of 100, while surfaces with little or no image clarity have DOI value of 0. The method used to determine smoothness will typically depend on the ultimate end use for the powder-coated substrate.

The term "faraday cage effect," as used herein, refers to a phenomenon observed during electrostatic application of a powder coating. Specifically, a faraday cage is an electrostatic enclosure resulting from the pattern of field lines generated between the electrode on the spraying apparatus and the grounded substrate. The difference in voltage between the two surfaces induces a strong electric field between the spraying apparatus and the substrate. Consequently, charged powder particles follow the resultant field lines and do not cover corners, edges and other recessed areas. Faraday cage penetration refers to the ability of certain powder particles to travel through holes in the electrostatic enclosure or faraday cage, and coat the substrate.

As used herein, the term "back ionization" refers to a phenomenon that occurs when a powder coating is applied over a non-gelled surface, typically a first powder coating that has not been fully cured. As more powder is applied, the surface becomes saturated with charge and powder particles are repelled from the surface, with resultant electrostatic mixing of powder layers, leading to non-uniform coating and film build.

The term "transfer efficiency," as used herein, refers to the percentage of powder particles or coating solids leaving the spray apparatus that are actually deposited on the substrate. Back ionization and faraday cage effects reduce overall transfer efficiency.

Unless otherwise indicated, the term "polymer" includes both photopolymers and copolymers (i.e., polymers of two or more different monomers).

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

Embodiments of the invention described herein include methods and systems for powder coating a metal substrate, including at the corners, edges and other recessed areas. The methods include steps for applying at least one powder composition to a substrate, wherein using an application package or additive reduces faraday cage effects and back ionization, and increases transfer efficiency when a powder coating is applied electrostatically over a non-gelled surface or powder.

Accordingly, in some embodiments, the present invention provides methods or systems for coating a substrate, including at the corners, edges or other recessed areas, with a process that uses an application additive to increase faraday cage penetration while limiting back ionization. The methods described herein therefore eliminate the need to modify spray equipment or spray lines in order to reduce faraday cage effects or back ionization. Moreover, as the methods described herein provide optimal coverage for the corners, edges, and other recessed areas of substrates, alternative mechanical methods to coat the corners or edges prior to applying a powder coating are no longer necessary. Therefore, the methods described herein reduce the time, energy and cost of powder coating a substrate, including at the edges, without compromising corrosion resistance or surface smoothness of the coating.

In an embodiment, the methods described herein include applying at least a first powder composition to a substrate. The powder composition is a fusible composition that melts on application of heat to form a coating film. The powder is applied using methods known to those of skill in the art, such as, for example, electrostatic spray methods, to a film thickness of about 25 to about 75 microns, preferably 35 to 65 microns. In an aspect, the powder composition is applied to either the clean (i.e., unprimed) or pretreated surface of a metal substrate, i.e., the powder composition may be applied to a metal surface that is unprimed, that has been clean-blasted or e-coated, or a surface that has been pretreated by various methods known to those of skill in the art. In a preferred aspect, the powder composition is applied over a first powder composition that has not been cured or is only partially cured, i.e. a non-gelled powder coating.

In an embodiment, the method described herein includes applying at least a second powder composition to a substrate after at least a first powder composition has been applied. In an aspect, the second powder composition may have the same chemical composition as the first composition, or it may be different. The first and second powder compositions may be compatible or incompatible. The second powder composition is applied using methods known to those of skill in the art, such as, for example, electrostatic spray methods. The second powder composition may be applied at a reduced film build, as it is preferably applied over a non-gelled or uncured or partially cured coating of the first powder composition, to a film build of 20 to 40 microns, preferably 25 to 100, more preferably 50 to 75 microns. The optimal total thickness of the film formed by the powder composition, or by first and second powder compositions may be about 50 to 175, preferably 85 to 135 microns (approx. 3.5 to 5.5 mil).

In an embodiment, the methods described herein include applying at least a second powder composition after at least a first powder composition has been applied on the metal substrate. Powder compositions are typically applied by electrostatic spray methods, where the particles of the powder composition are charged and the substrate is grounded or earthed. Powder particles are charged by either the interaction of the particles with ionized air (i.e., corona-charged), or by friction (i.e., tribo-charged). Application-related complications can arise during electrostatic spray, and film build and transfer efficiency are affected by electrical field lines between the spray gun and the substrate, i.e., faraday cage effects. These problems may be overcome by using fluidized bed methods for coating a substrate, but these methods produce substantially thicker coatings and are not feasible for various end-uses.

A powder composition applied or sprayed onto a surface coated with a non-gelled powder is unlikely to produce gloss or surface smoothness similar or equivalent to a powder composition sprayed directly on to a metal surface. Without limiting to theory, it is believed that when a second powder composition is applied over a first non-gelled powder, the build-up of charged powder particles on the surface leads to back ionization, and powder particles begin to lift off the surface, resulting in non-uniform film build. Moreover, faraday cage formation is typical, and inhibits coating at the edges, corners, or other recessed areas of the substrate, leading to a non-uniform film and/or reduced surface smoothness. Without limiting to theory, to overcome faraday cage effects when electrostatically applying powder coatings to surfaces with corners, edges, sharp surfaces or other recessed or non-planar geometries, it is necessary to decrease faraday cage formation or increase the number of particles that can penetrate the faraday cage.

Conventionally, faraday cage effects are decreased by reducing the output of the application tool, such as a spray gun, for example, to increase holes in the faraday cage, such that more powder particles penetrate the faraday cage and are deposited. However, such methods require reducing the line speed, and an overall decrease in transfer efficiency. Alternatively, faraday cage penetration can be increased by altering the characteristics of the powder particles, as described for example, in U.S. Pat. No. 6,130,281. In general, smaller particles have the best penetration but demonstrate lower transfer efficiency. Therefore, in order to coat an article or substrate with optimal film build and smoothness, including at the edges, corners or other recessed areas, it is preferable to modify the application characteristics of the coating composition.

Accordingly, the methods and systems described herein include a powder coating composition and an application package. The application package described herein helps reduce faraday cage effects and back ionization without significant modification of powder characteristics or application equipment. The application package described herein allows an article or substrate already coated with a non-gelled powder composition to be sprayed or coated with a second powder composition at optimal film thickness, and contrary to expectations in the industry, provides surface smoothness or gloss at least equivalent to powder coatings applied directly to metal.

In an aspect, the methods described herein produce optimal surface smoothness. The methods described herein produce surface smoothness on the PCI scale of at least 4, preferably at least 5. Measured as 20-degree gloss or 60-degree gloss, the methods described herein produce relative surface smoothness of about 25 to 90%, preferably above 60%, and more preferably above 80%. Typically and preferably, the smoothness of the surface will be determined by the desired end use for the powder-coated metal substrate.

In an embodiment, the powder composition includes at least one polymeric binder. The powder composition may also optionally include one or more pigments, opacifying agents or other additives.

Suitable polymeric binders generally include a film forming resin and optionally a curing agent for the resin. The binder may be selected from any resin or combination of resins that provides the desired film properties. Suitable examples of polymeric binders include thermoset and/or thermoplastic materials, and can be made with epoxy, polyester, polyurethane, polyamide, acrylic, polyvinylchloride, nylon, fluoropolymer, silicone, other resins, or combinations thereof. Thermoset materials are preferred for use as polymeric binders in powder coating applications, and epoxies, polyesters and acrylics are particularly preferred. If desired, elastomeric resins may be used for certain applications. In an aspect, specific polymeric binders or resins are included in the powder compositions described herein depending on the desired end use of the powder-coated substrate. For example, certain high molecular weight polyesters show superior corrosion resistance and are suitable for use on substrates used for interior and exterior applications. In a preferred aspect, the polymeric binder is a polyester, preferably an isophthalic-based polyester crosslinked with triglycidyl isocyanurate (TGIC).

Examples of preferred binders include the following: carboxyl-functional polyester resins cured with epoxide-functional compounds (e.g., triglycidylisocyanurate), carboxyl-functional polyester resins cured with polymeric epoxy resins, carboxyl-functional polyester resins cured with hydroxyalkyl amides, hydroxyl-functional polyester resins cured with blocked isocyanates or uretdiones, epoxy resins cured with amines (e.g., dicyandiamide), epoxy resins cured with phenolic-functional resins, epoxy resins cured with carboxyl-functional curatives, carboxyl-functional acrylic resins cured with polymeric epoxy resins, acrylic resins cured with blocked isocyanates or uretdiones, unsaturated resins cured through free radical reactions, and silicone resins used either as the sole binder or in combination with organic resins. The optional curing reaction may be induced thermally, or by exposure to radiation (e.g., UV, UV-vis, visible light, IR, near-IR, and e-beam).

The methods and systems described herein include at least one powder composition with an application package. Suitable application packages include a combination of various ingredients, including preferably an antistatic component, a highly dispersed component and the like. The antistatic component is preferably an extrudable component, and the highly dispersed component is preferably a post-blended additive component.

In an embodiment, the antistatic additive is an extrudable component. Suitable extrudable antistatic components include, for example, salts of alkali metals, salts of alkaline earth metals, quarternary ammonium salts, polymeric antistatic agents, surfactants, and the like. Suitable metal salts for use as the antistatic component include salts of $C_1$-$C_{20}$ monocarboxylic acids or $C_2$-$C_{20}$ dicarboxylic acids, salts of $C_1$-$C_{20}$ sulfonic acids, organic acid salts of alkali metals or alkaline earth metals, salts of hydrohalic acids, salts of inorganic acids, and the like. Examples include, without limitation, salts of carboxylic acids such as formic acid, acetic acid, propionic acid, oxalic acid, succinic acid, etc., salts of sulfonic acids such as methanesulfonic acid, p-toluenesulfonic acid, etc., salts of organic acids such as thiocyanic acid etc., salts of hydrohalic acids, such as HCl, HBr, etc., and salts of inorganic acids such as $HClO_4$, $H_2SO_4$, $H_3PO_4$, etc. Halide salts, acetates and perchlorates of alkali metals are preferred.

Suitable quarternary ammonium salts for use as the antistatic component include inorganic and organic salts, i.e. salts formed by the reaction of a tertiary amine compound with an inorganic or organic acid. Inorganic quarternary ammonium salts include, for example, quarternary ammonium salts of HF, HCl, HBr, HI, $HNO_3$, $H_2SO_4$, $H_3PO_4$, $H_3BO_3$, $HClO_4$, and the like, as well as mixtures or complexes of these acids. Organic quarternary ammonium salts include, without limitation, compounds having the structure $N(R)_4^+X^-$, wherein each R is independently substituted or unsubstituted $C_1$-$C_{18}$ alkyl or aryl, and X is a anionic radical. Preferred organic quarternary ammonium salts include alkyl ammonium or dialkyl ammonium salts, more preferably methyl ethyl ammonium or dimethyl ethyl ammonium salts of organic acids, most preferably methyl ethyl ammonium or dimethyl ethyl ammonium salts of lauric acid, myristic acid, stearic acid, oleic acid, and the like. The anionic radical is preferably $C_1$-$C_{10}$ alkyl sulfates, more preferably ethyl, propyl or butyl sulfate, most preferably ethyl sulfate.

Suitable polymeric antistatic agents include thermoplastic resins with antistatic groups or blocks incorporated into the polymer chain, such as, for example, block copolymers with polyolefins, polyether ester amides, and the like. Examples of block copolymers suitable for the methods described herein include, without limitation, polymers or copolymers obtained by polymerization of one or more olefins with 2 to 30 carbon atoms, preferably 2 to 10 carbon atoms, and more preferably propylene or ethylene carbon atoms. Examples of polyether ester amides suitable for the methods described herein include, without limitation, polyether ester amides made from Bisphenol A.

Suitable surfactants for use in the methods described herein include, for example, nonionic, anionic, cationic or zwitterionic surfactants. Examples of nonionic surfactants include, without limitation, polyethylene glycol type surfactants, polyhydric alcohol type surfactants, and the like. Anionic surfactants include, for example, carbonates, sulfuric acid ester salts, sulfonates, phosphoric acid ester salts of alkali metals, higher alcohols, higher alkyl ethers, alkylbenzene, paraffin and the like. Examples of cationic surfactants include quaternary ammonium salts such as alkyltrimethylammonium salts and the like, as described above. Zwitterionic surfactants include, for example, amino acid type surfactants, betaine type zwitterionic, and the like. Surfactants may be used singly or in combination with other surfactants or classes of surfactants. Preferably, the surfactant is an anionic surfactant, more preferably sulfonates, and most preferably alkylbenzene sulfonates, alkylsulfonates, paraffin sulfonates, and the like.

The methods and systems described herein include an application package that includes an antistatic component and a highly dispersed component. In an embodiment, the highly dispersed component is a post-blended component. The term "post-blended" refers to an active ingredient or component added to the powder composition after extrusion but during or prior to the pulverization stage. Suitable post-blended components for use in the methods described herein include, for example, waxes, metal oxides, metal hydroxides, mixtures thereof, and the like. Examples of waxes include natural waxes (carnauba, lanolin, beeswax, and the like), petroleum-derived waxes (paraffin and the like), polymer-based waxes (polyethylene wax, PTFE wax, polyamide-modified wax, and the like), and hydrocarbon wax (long chain (i.e., at least $C_{16}$) fatty acid or ester-based waxes, and the like). Examples of metal oxides include hydrophobic silica, hydrophilic silica, aluminum oxide (i.e., alumina), and the like. Examples of metal hydroxides include aluminum hydroxide, and the like. Mixtures of metal oxide and metal hydroxide are suitable post-blended components, as are wax-coated metal oxides and metal hydroxides. Preferably, the post-blended component is a highly dispersed fumed metal oxide, more preferably fumed alumina. Preferably, the post-blended component is a highly dispersed fumed metal oxide with D50 particle size of about 6 to 60 microns, preferably about 10 to 30 microns, or agglomeration particle size of about 1 to 100 nm, preferably 5 to 50 nm.

In a preferred embodiment, the methods and systems described herein include an application package that includes an antistatic component and a highly dispersed fumed metal oxide. The antistatic component is preferably a pre-extrusion additive, while the fumed metal oxide is preferably a post-blended component. The antistatic agent is preferably present in an amount of 0.1 to 3%, more preferably 0.05 to 2.5%, and most preferably 0.01 to 2%, based on the total weight of the powder composition. The fumed metal oxide is preferably present in an amount of up to about 2%, more preferably about 0.005 to 1.5%, and most preferably about 0.01 to 1%, based on the total weight of the powder composition.

The powder composition may optionally include other additives. These other additives can improve the application of the powder coating, the melting and/or curing of that coating, or the performance or appearance of the final coating. Examples of optional additives which may be useful in the powder include: cure catalysts, antioxidants, color stabilizers, slip and mar additives, UV absorbers, hindered amine light stabilizers, photoinitiators, conductivity additives, tribocharging additives, anti-corrosion additives, fillers, texture agents, degassing additives, flow control agents, thixotropes, and edge coverage additives.

In the methods described herein, the polymeric binder and antistatic agent are preferably dry mixed together, along with any optional additives, and then is typically melt blended by passing through an extruder. The resulting extrudate is solidified by cooling, the post-blended component is added, and the extrudate is ground or pulverized to form a powder. Other methods may also be used. For example, one alternative method uses a binder that is soluble in liquid carbon dioxide. In that method, the dry ingredients are mixed into the liquid carbon dioxide and then sprayed to form the powder particles. If desired, powders may be classified or sieved to achieve a desired particle size and/or distribution of particle sizes. In a preferred aspect, the post-blended component is added during the pulverization step.

The resulting powder is at a size that can effectively be used by the application process. Practically, particles less than 10 microns in size are difficult to apply effectively using conventional electrostatic spraying methods. Consequently, powders having median particle size less than about 25 microns are difficult to electrostatically spray because those powders typically have a large fraction of small particles. Preferably the grinding is adjusted (or sieving or classifying is performed) to achieve a powder median particle size of about 25 to 150 microns, more preferably 30 to 70 microns, most preferably 30 to 50 microns.

Optionally, other additives may also be used in the methods and systems of the present invention. As discussed above, these optional additives may be added prior to extrusion and be part of the base powder, or may be added after extrusion and/or during pulverization. Suitable additives for addition after extrusion include materials that would not perform well if they were added prior to extrusion; materials that would cause additional wear on the extrusion equipment, or other additives.

Additionally, optional additives include materials which are feasible to add during the extrusion process, but may also be added later. The additives may be added alone or in combination with other additives to provide a desired effect on the powder finish or the powder composition. These other additives can improve the application of the powder, the melting and/or curing, or the final performance or appearance. Examples of optional additives which may be useful include: cure catalysts, antioxidants, color stabilizers, slip and mar additives, UV absorbers, hindered amine light stabilizers, photoinitiators, conductivity additives, tribocharging additives, anti-corrosion additives, fillers, texture agents, degassing additives, flow control agents, thixotropes, and edge coverage additives.

Other preferred additives include performance additives such as rubberizers, friction reducers, and microcapsules. Additionally, the additive could be an abrasive, a heat sensitive catalyst, an agent that helps create a porous final coating, or that improves wetting of the powder.

Techniques for preparing low flow and high flow powder compositions are known to those of skill in the art. Mixing can be carried out by any available mechanical mixer or by manual mixing. Some examples of possible mixers include Henschel mixers (available, for example, from Henschel Mixing Technology, Green Bay, Wis.), Mixaco mixers (available from, for example, Triad Sales, Greer, S.C. or Dr. Herfeld GmbH, Neuenrade, Germany), Marion mixers (available from, for example, Marion Mixers, Inc., 3575 3rd Avenue, Marion, Iowa), invertible mixers, Littleford mixers (from Littleford Day, Inc.), horizontal shaft mixers and ball mills. Preferred mixers would include those that are most easily cleaned.

The coating is optionally cured, and such curing may occur via continued heating, subsequent heating, or residual heat in the substrate. In another embodiment of the invention, if a radiation curable powder coating base is selected, the powder can be melted by a relatively short or low temperature heating cycle, and then may be exposed to radiation to initiate the curing process. One example of this embodiment is a UV-curable powder. Other examples of radiation curing include using UV-vis, visible light, near-IR, IR and e-beam.

The compositions and methods described herein may be used with a wide variety of substrates. Typically and preferably, the powder coating compositions described herein are used to coat metal substrates, including without limitation, unprimed metal, clean-blasted metal, and pretreated metal, including plated substrates and ecoat-treated metal substrates. Typical pretreatments for metal substrates include, for example, treatment with iron phosphate, zinc phosphate, and the like. Metal substrates can be cleaned and pretreated using a variety of standard processes known in the industry. Examples include, without limitation, iron phosphating, zinc phosphating, nanoceramic treatments, various ambient temperature pretreatments, zirconium containing pretreatments, acid pickling, or any other method known in the art to yield a clean, contaminant-free surface on a substrate.

The coating compositions and methods described herein are not limited to conversion coatings, i.e. parts or surfaces treated with conversion coatings. Moreover, the coating compositions described herein may be applied to substrates previously coated by various processes known to persons of skill in the art, including for example, ecoat methods, plating methods, and the like. There is no expectation that substrates to be coated with the compositions described herein will always be bare or unprimed metal substrates.

Preferably, the coated substrate has desirable physical and mechanical properties, including optimal edge coverage of sharp edges and surface smoothness. Typically, the final film coating will have a thickness of 25 to 200 microns, preferably 50 to 150 microns, more preferably 75 to 125 microns.

The following examples are offered to aid in understanding of the present invention and are not to be construed as limiting the scope thereof. Unless otherwise indicated, all parts and percentages are by weight.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

EXAMPLES

Unless indicated otherwise, the following test methods were utilized in the Example(s) that follow(s).

Gloss

The surface gloss of the coating is measured as 20-degree gloss or 60-degree gloss using the procedure described ASTM D523 (Standard Test Method for Specular Gloss).

Film Thickness Measurement

Dry film thickness is measured using a digital coating thickness gauge. On magnetic metal surfaces, the digital gauge operates via electromagnetic induction, and on non-ferrous metals, eddy currents are used to measure film thickness. These methods are standard and well known to those of skill in the art.

Example 1

Preparation of Coating Composition

Control formulations of a powder composition were prepared using isophthalic-based polyesters crosslinked with triglycidyl isocyanurate (TGIC) to produce a composition with specific gravity of 1.34. Altered formulations A and B were prepared in a similar manner, with about 0.5% of antistatic agent added prior to extrusion, based on the total weight of the powder composition. About 0.2% fumed aluminum oxide was added as a post-blend ingredient during pulverization of the Control formulation and Altered formulation A, but not Altered formulation B. The prepared powder compositions were applied to cold-rolled steel panels over an existing coating of a non-gelled powder on the panel surface. Smoothness, reported as 20-degree and 60-degree gloss, is shown in Table 1. Increased surface smoothness suggests reduced back ionization and increased faraday cage penetration.

TABLE 1A

Gloss Values Inside Faraday Cage (Control Formulation)
Control Formulation Over Non-Gelled Powder

| 20° Gloss Line Speed | Averages Lead Face | Lead Corner | Middle Face | Lag Corner | Lag Face |
|---|---|---|---|---|---|
| 18 f/min | 58.5 | 49.5 | 62.5 | 53.0 | 61.0 |
| 60° Gloss | Averages | Lead Corner | Middle Face | Lag Corner | Lag Face |
| 18 f/min | 90.0 | 88.5 | 92.0 | 89.8 | 90.0 |

TABLE 1B

Gloss Values Inside Faraday Cage (Altered Formulation A)
Altered Formulation Over Non-Gelled Powder

| 20° Gloss Line Speed | Averages Lead Face | Lead Corner | Middle Face | Lag Corner | Lag Face |
|---|---|---|---|---|---|
| 18 f/min | 86.5 | 66.5 | 74.0 | 54.0 | 84.0 |
| 60° Gloss | Averages | Lead Corner | Middle Face | Lag Corner | Lag Face |
| 18 f/min | 95.5 | 94.8 | 95.5 | 90.0 | 96.0 |

TABLE 1C

Gloss Values Over Non-Gelled Powder (Altered Formulation B)
Altered Formulation Over Non-Gelled Powder

| 20° Gloss Line Speed | Averages Lead Face | Lead Corner | Middle Face | Lag Corner | Lag Face |
|---|---|---|---|---|---|
| 18 f/min | 77.0 | 58.5 | 67.5 | 55.3 | 82.0 |

| 60° Gloss | Averages | Lead Corner | Middle Face | Lag Corner | Lag Face |
|---|---|---|---|---|---|
| 18 f/min | 93.0 | 92.5 | 94.5 | 90.5 | 96.0 |

Example 2

Coating Thickness as Function of Faraday Cage Penetration

Panels were prepared as described in Example 1, and final cured film thickness inside the faraday cage was measured and is shown in Table 2. An increase in cured film thickness, particularly at the corners, suggests increased faraday cage penetration by the powder particles during application.

TABLE 2A

Measured Cured Film Thickness (Control Formulation)
Control Formulation Over Non-Gelled Powder
Average film thickness (mil)

| Line Speed | Lead Face | Lead Corner | Middle Face | Lag Corner | Lag Face |
|---|---|---|---|---|---|
| 18 f/min | 1.81 | 1.03 | 2.16 | 1.17 | 2.18 |

TABLE 2B

Measured Cured Film Thickness (Altered Formulation A)
Altered Formulation Over Non-Gelled Powder
Average film thickness (mil)

| Line Speed | Lead Face | Lead Corner | Middle Face | Lag Corner | Lag Face |
|---|---|---|---|---|---|
| 18 f/min | 2.52 | 1.36 | 2.28 | 1.51 | 2.60 |

TABLE 2C

Measured Cured Film Thickness (Altered Formulation B)
Altered Formulation Over Non-Gelled Powder
Average film thickness (mil)

| Line Speed | Lead Face | Lead Corner | Middle Face | Lag Corner | Lag Face |
|---|---|---|---|---|---|
| 18 f/min | 1.52 | 0.75 | 2.02 | 1.12 | 2.22 |

What is claimed is:

1. A system for improving application of a powder coating composition to a metal substrate, comprising:
    a powder coating composition; and
    an application package containing an extrudable antistatic component and a highly dispersed post-blended component
    wherein the system is applied electrostatically over a previously applied non-gelled powder coating applied on the metal substrate.

2. The system of claim 1, wherein the system is made by a method comprising:
    providing at least a first polymeric binder resin;
    adding the extrudable antistatic component of the application package to the resin to form a mixture;
    extruding the mixture;
    adding a highly dispersed post-blend component of the application package and pulverizing the extruded mixture to form the system.

3. The system of claim 1, wherein the extrudable antistatic component is a quaternary ammonium salt.

4. The system of claim 1, wherein the post-blended component is a fumed metal oxide.

5. The system of claim 3, wherein the application package comprises
    about 0.1 to 2 wt % of the antistatic component, based on the total weight of the powder composition; and
    about 0.01 to 1 wt % of highly dispersed fumed metal oxide, based on the total weight of the powder composition.

6. The system of claim 1, wherein a cured film formed by the system has improved 20-degree gloss relative to a cured film formed by a powder coating composition that does not include the application package.

7. The system of claim 1, wherein a cured film formed by the system has improved 60-degree gloss relative to a cured film formed by a powder coating composition that does not include the application package.

* * * * *